(12) United States Patent
Van Nieuwenhove et al.

(10) Patent No.: US 11,370,181 B2
(45) Date of Patent: Jun. 28, 2022

(54) METHODS FOR MANUFACTURING COMPOSITE COMPONENTS

(71) Applicant: General Electric Company, Schenectady, NY (US)

(72) Inventors: Stefaan Guido Van Nieuwenhove, Hohenkammer (DE); Wendy Wenling Lin, Montgomery, OH (US); Todd Alan Anderson, Niskayuna, NY (US); Shatil Sinha, Clifton Park, OH (US)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 15/786,804

(22) Filed: Oct. 18, 2017

(65) Prior Publication Data

US 2019/0111636 A1    Apr. 18, 2019

(51) Int. Cl.
*B29C 70/38* (2006.01)
*B29C 70/22* (2006.01)
(Continued)

(52) U.S. Cl.
CPC ............ *B29C 70/38* (2013.01); *B29C 70/205* (2013.01); *B29C 70/228* (2013.01); *B29C 70/30* (2013.01); *B29C 70/541* (2013.01); *B29D 99/0025* (2013.01); *B32B 18/00* (2013.01); *B32B 37/16* (2013.01); *F01D 5/14* (2013.01); *B29B 11/16* (2013.01); *B29C 70/086* (2013.01); *B29C 70/088* (2013.01); *B29C 70/382* (2013.01); *B29C 70/386* (2013.01); *B29C 70/54* (2013.01); *B29C 70/86* (2013.01); *B29C 2791/001* (2013.01); *B29C 2793/009* (2013.01);
(Continued)

(58) Field of Classification Search
None
See application file for complete search history.

(56) References Cited

U.S. PATENT DOCUMENTS 3,942,231 A * 3/1976 Whitaker ................ B23P 15/04
29/889.7
5,038,291 A    8/1991 Wang et al.
(Continued)

FOREIGN PATENT DOCUMENTS

EP           3109025 A1 * 12/2016  ........... B29C 70/345
EP           3109025 A1    12/2016
WO   WO-2012045969 A1 *  4/2012  ......... B29D 99/0003

OTHER PUBLICATIONS

European Search Report Corresponding with EP Application 182006866 dated Mar. 25, 2019.

*Primary Examiner* — Jacob T Minskey
*Assistant Examiner* — Caroline Beha
(74) *Attorney, Agent, or Firm* — Dority & Manning, P.A.

(57) ABSTRACT

Methods for manufacturing composite components having complex geometries are provided. In one exemplary aspect, a method includes laying up each of a plurality of laminates to an initial shape with a substantially planar geometry or a gently curved geometry. Then, a laid up laminate is formed to a final shape for each predefined section defined by the composite component to be manufactured. Thereafter, the laminates formed to their respective final shapes are stacked to build up the complex geometry of the composite component. Next, the composite component can be cured and finish machined as necessary to form the completed composite component.

19 Claims, 10 Drawing Sheets

(51) Int. Cl.
  *B29D 99/00*     (2010.01)
  *B29C 70/20*     (2006.01)
  *B29C 70/30*     (2006.01)
  *B29L 31/08*     (2006.01)
  *B32B 37/16*     (2006.01)
  *F01D 5/14*      (2006.01)
  *B32B 18/00*     (2006.01)
  *B29C 70/54*     (2006.01)
  *F01D 5/28*      (2006.01)
  *B29C 70/08*     (2006.01)
  *B29B 11/16*     (2006.01)
  *B29C 70/86*     (2006.01)

(52) U.S. Cl.
  CPC ... *B29C 2793/0045* (2013.01); *B29L 2031/08* (2013.01); *B32B 2603/00* (2013.01); *C04B 2237/76* (2013.01); *F01D 5/282* (2013.01); *F05D 2230/00* (2013.01); *F05D 2240/10* (2013.01); *F05D 2240/20* (2013.01); *F05D 2300/603* (2013.01)

(56) References Cited

U.S. PATENT DOCUMENTS

| | | | |
|---|---|---|---|
| 5,131,970 A | 7/1992 | Potter et al. | |
| 5,290,836 A | 3/1994 | Trudeau | |
| 5,817,265 A * | 10/1998 | Gendreau | B29B 11/06 264/138 |
| 6,096,164 A | 8/2000 | Benson et al. | |
| 7,580,816 B2 | 8/2009 | Thompson et al. | |
| 8,444,792 B2 | 5/2013 | Ossanai | |
| 8,714,226 B2 | 5/2014 | Senibi et al. | |
| 8,955,206 B2 | 2/2015 | Miller | |
| 9,550,349 B1 | 1/2017 | Larsen et al. | |
| 2002/0028332 A1* | 3/2002 | Pratt | B32B 1/00 428/364 |
| 2004/0231786 A1* | 11/2004 | Habisreitinger | B29C 70/46 156/264 |
| 2007/0023975 A1* | 2/2007 | Buckley | B29B 11/16 264/494 |
| 2008/0182054 A1* | 7/2008 | Ridges | B29C 70/30 428/35.2 |
| 2011/0024562 A1* | 2/2011 | Kastner | B29C 70/30 244/119 |
| 2013/0149164 A1* | 6/2013 | Hansen | B29C 70/44 416/226 |
| 2013/0174969 A1* | 7/2013 | Karb | B29B 11/16 156/196 |
| 2014/0086751 A1* | 3/2014 | Bottome | F01D 11/008 416/193 R |
| 2016/0101543 A1 | 4/2016 | Fisher, Jr. et al. | |
| 2016/0257102 A1 | 9/2016 | Butler | |
| 2016/0339647 A1 | 11/2016 | Matsen et al. | |
| 2016/0354983 A1 | 12/2016 | Kakimoto et al. | |
| 2017/0043539 A1 | 2/2017 | Madsen et al. | |
| 2017/0087816 A1 | 3/2017 | Larsen et al. | |

\* cited by examiner

METHODS FOR MANUFACTURING COMPOSITE COMPONENTS

FIELD

The present subject matter relates generally to methods for manufacturing composite components. More particularly, the present subject matter relates to methods for manufacturing composite components having complex geometries for gas turbine engines.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More commonly, composite materials are being used to manufacture various components within gas turbine engines. For instance, fan blades, airfoils within the compressor and turbine sections, as well as other complex 3D components are more commonly being manufactured from composite materials. For example, fan blades, compressor rotor blades, and compressor stator vanes have been manufactured from polymer matrix composite materials (PMC), and combustor liners, turbine rotor blades, and turbine stator vanes have been manufactured from ceramic matrix composite materials (CMC). Such composite components offer high strength-to-weight ratios and can better withstand extreme pressures and temperatures than more traditional materials, among other benefits.

The manufacture of such composite components has conventionally been time consuming and prone to errors. High performance composite components (e.g., fan blades and airfoils) have been particularly time consuming to manufacture and prone to errors due to their complex 3D shapes, big thickness variations, and overall ply definition. The buildup of such complex composite components has typically been done by hand as a direct 3D build up process. Such conventional processes have typically included: cutting ply shapes out of prepreg material (one ply can include multiple pieces so that it may conform to the required 3D-shape during layup), sorting and storing of the cut plies and ply pieces, manually positioning and draping each ply (or piece of ply) to the required 3D-shape on the layup/cure tool, intermediate and frequent compactions and/or autoclave debulks are preformed to prevent wrinkling and other common defects, and then the component is cured.

Such direct 3D build up processes to manufacture composite components with complex geometry require skilled laborers and have led to high manual labor costs due to the manual cutting, sorting, storing, and laying up of the plies or pieces of plies. In addition, the use of such processes has led to a significant amount of material waste and has limited the ply fiber orientation possibilities.

Accordingly, improved methods for manufacturing composite components would be useful. In particular, methods for manufacturing composite components having complex geometries more efficiently with improved part-to-part consistency and quality would be beneficial.

BRIEF DESCRIPTION

Aspects and advantages of the invention will be set forth in part in the following description, or may be obvious from the description, or may be learned through practice of the invention.

In one exemplary embodiment, a method for manufacturing a composite component having a complex geometry is provided. The composite component to be formed defines a plurality of predefined sections. The method includes laying up each of a plurality of laminates to an initial shape, wherein each of the plurality of laminates comprise one or more plies; forming, for each of the plurality of predefined sections, one or more of the plurality of laminates from the initial shape to a final shape; and thereafter, stacking the plurality of laminates formed to their respective final shapes to build up the complex geometry of the composite component.

In another exemplary embodiment, a method for manufacturing a composite component having a complex geometry is provided. The composite component to be formed defines a plurality of predefined sections. The method includes laying up a plurality of laminates each comprising a plurality of plies to an initial shape, wherein one or more of the plurality of laminates are laid up to the initial shape with an automated layup system with a substantially planar geometry or a gently curved geometry, and wherein the plurality of laminates includes a first laminate; forming the first laminate from the initial shape to a final shape for one of the plurality of predefined sections; and stacking and then forming each subsequent laminate of the plurality of laminates on the first laminate to their respective final shapes to build up the complex geometry of the composite component.

In yet another exemplary embodiment, a method for manufacturing a composite airfoil for a gas turbine engine is provided. The airfoil to be manufactured defines a plurality of predefined sections. The method includes laying up a plurality of laminates to an initial shape, wherein each of the plurality of laminates comprise one or more plies having a reinforcement material embedded within a matrix material, wherein the plurality of laminates are laid up with a substantially planar geometry or a gently curved geometry using an automated layup system; forming at least one of the plurality of laminates from the initial shape to a final shape for each of the plurality of predefined sections; and thereafter, stacking the plurality of laminates formed to their respective final shapes to build up the airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
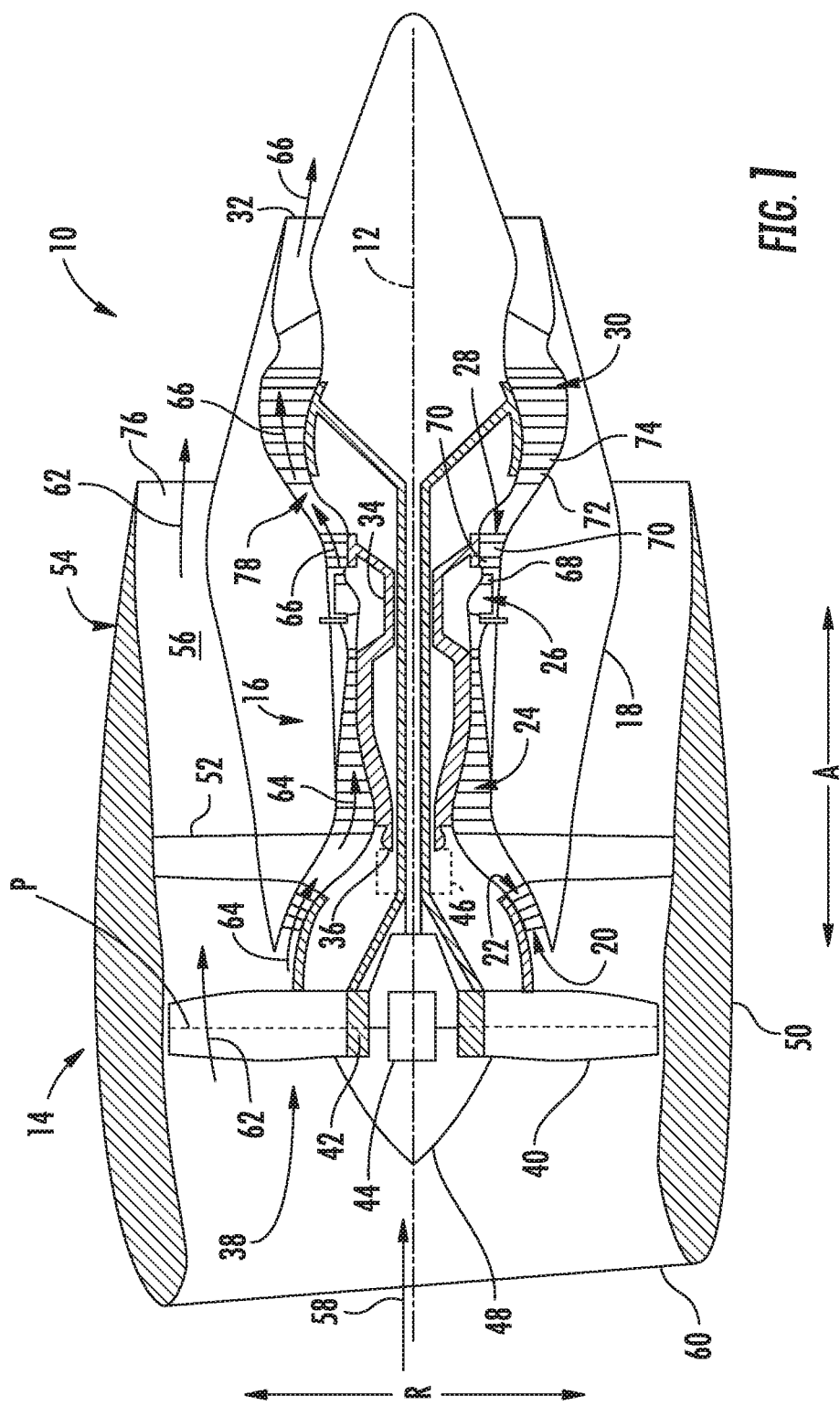
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. As used herein, the term "complex geometry" means a component having one or more surfaces that are non-planar. The term "substantially planar geometry" means a surface, component, or object that extends in a plane but which might include small elevations or depressions (e.g., slight surface variations) within manufacturing tolerance. The term "about" means within ten percent of the stated value.

Exemplary aspects of the present disclosure are directed to methods for manufacturing composite components, and more particularly, to methods for manufacturing composite components having complex geometries, such as e.g., a fan blade for a gas turbine engine. In one exemplary aspect, the composite component to be manufactured defines a plurality of predefined sections. The exemplary method includes laying up a plurality of laminates that each include one or more plies. Each of the plurality of laminates are laid up to an initial shape with a substantially planar geometry or a gently curved geometry. Then, a laid up laminate is formed from its initial shape to a final shape for each of the predefined sections of the composite component. The laminates are formed on forming tools dedicated to forming laminates to a specific final shape that corresponds with one of the predefined sections. Thereafter, the plurality of laminates formed to their respective final shapes are stacked to build up the complex geometry of the composite component. Next, the composite component can be cured and finish machined as necessary to form the completed composite component.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Various components of turbofan engine 10 can be formed from composite materials. For instance, fan blades, airfoils within the compressor section and turbine sections, combustor liners, as well as other components can be formed from composite materials. Such composite components can include a reinforcing material embedded within a matrix material. Such composite materials can include any suitable reinforcing material. By way of example, suitable reinforcing materials include relatively continuous fibers, or tows, arranged to form a unidirectional array of fibers. Useful fibers to be included in such reinforcing materials, such as tapes, or fabrics, include without limitation, glass fibers, carbon and graphite fibers, basalt fibers, polymeric fibers, including aramide and boron filaments, silica fibers, copper fibers and the like. The fibers may be non-conductive or conductive, depending upon the desired application of the composite fiber. It will be appreciated that the disclosure is not limited to these noted fiber types. The reinforcing material can be embedded within any suitable matrix material. For example, suitable matrix material can include polymeric (including thermosetting materials, e.g., epoxies, and thermoplastic materials, e.g., polyether ether ketone (PEEK)), ceramic, combinations thereof, or other suitable matrix materials. In this way, for gas turbine engines such as the turbofan engine 10 of FIG. 1, fan blades 40 and compressor rotor blades and stator vanes can be manufactured from polymer matrix composite materials (PMC), and turbine rotor blades 70, 74 and stator vanes 68, 72 can be manufactured from ceramic matrix composite materials (CMC).

Figure 2:
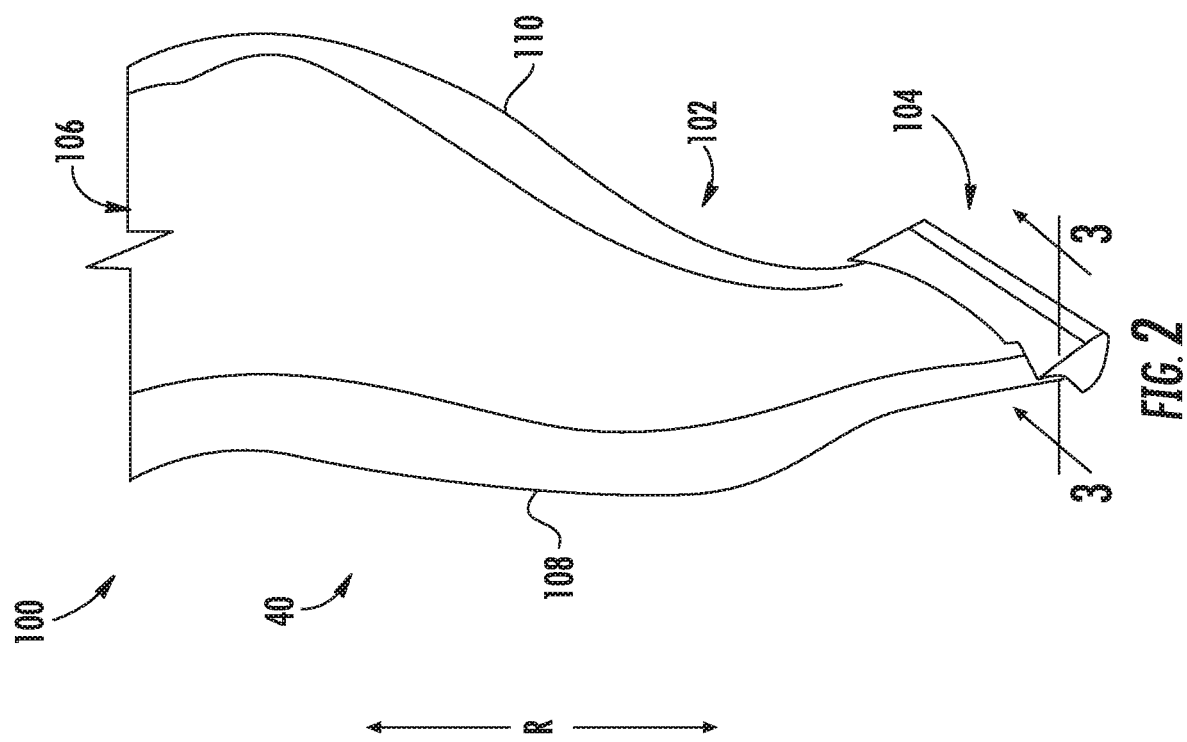
FIG. 2 provides a perspective view of a fan blade of the gas turbine engine of FIG. 1.

FIG. 2 provides a perspective view of an exemplary composite component 100 depicted as one of the fan blades 40 of the turbofan engine 10 of FIG. 1. Although the composite component 100 of FIG. 2 is depicted as fan blade 40 for use in fan 38 (FIG. 1), in other exemplary embodiments, the composite component can be an airfoil configured for use in a turbine blade assembly, a compressor blade assembly, or any other suitable application. In addition, the composite component can be other components of a gas turbine engine, such as e.g., one or more bands that define the flow path of the core turbine engine, a stator vane or airfoil of a nozzle assembly, a shroud, etc. Moreover, for this embodiment, fan blade 40 is formed from a composite material, and in particular, fan blade is formed of a PMC material with a metallic leading edge. Fan blade 40 can be coated with a polyurethane surface coating or other suitable coating to reduce wear on the blade. Although fan blade 40 is depicted as being formed from a PMC material, in other exemplary embodiments as noted above, various composite components of a gas turbine engine can include other matrix materials, such as CMC materials.

As illustrated in FIG. 2, the fan blade 40 includes an airfoil 102 and a root section 104 configured to couple fan blade 40 with disk 42 (FIG. 1). The airfoil 102 extends generally radially outward from the root section 104 toward nacelle 50 of the turbofan engine 10 (FIG. 1). In particular, airfoil 102 extends radially outward to a tip 106. Fan blade 40 has a chord length extending between a leading edge 108 and a trailing edge 110. The airfoil 102 generally defines an aerodynamic shape contoured to facilitate a flow of air across fan blade 40, as well as the other blades of fan 38 (FIG. 1). In particular, as shown, fan blade 40 has a complex 3D geometry that includes multiple curves about multiple directions as it extends from the root section 104 to the tip 106. Moreover, fan blade 40 has a big thickness variation between the leading edge 108 and the trailing edge 110.

Figure 3:
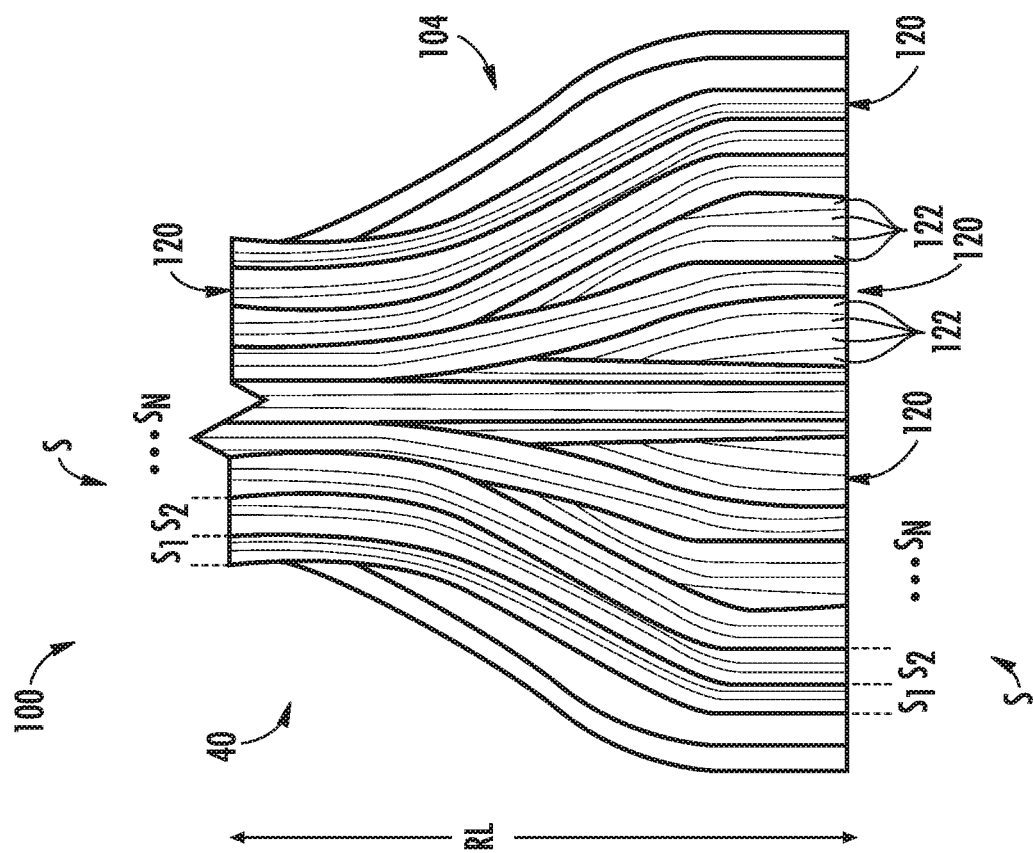
FIG. 3 provides a cross-sectional view of the fan blade of FIG. 2 depicting the laminate definition of the fan blade.

FIG. 3 provides a cross-sectional view of the fan blade 40 taken on line 3-3 of FIG. 2 depicting the laminate definition of the fan blade 40. More particularly, the root section 104 of the fan blade 40 is depicted in FIG. 3. As shown, the composite component 100, which in this embodiment is fan blade 40, is formed of a plurality of laminates 120 that each include one or more plies 122. Each of the plies 122 include a reinforcement material embedded within a matrix material. For example, the reinforcement material can be high grade carbon fibers and the matrix material can be a toughened epoxy resin mixed with one or more modifiers, such as e.g., thermoplastic or rubber materials. In some embodiments, the laminates 120 can include a limited number of plies 122 such that the laminates 120 are relatively thin. In one example, the laminates 120 can include no more than ten (10) plies per laminate. As another example, the laminates 120 can include no more than five (5) plies per laminate. As will be explained more fully below, by limiting the number of plies per laminate the laminates can be more easily formed, stacked, and otherwise processed to build up the composite component.

As further shown in FIG. 3, the composite component defines a plurality of predefined sections S. In this example, the laminates 120 define the predefined sections S of the fan blade 40. In particular, the composite component 100 defines a first section $S_1$, a section $S_2$, and so on to define an Nth section $S_N$. In some alternative embodiments, the predefined sections S may be defined by more than one laminate and may also include other layers that make up the composite component, such as e.g., a foam core. Moreover, as shown for this embodiment, some of the laminates 120 are defined along at least the root length RL of the root section 104 and some of the laminates 120 extend along only a portion of the root length RL of the root section 104. The laminates 120 extending along only a portion of the root length RL of the root section 104 are laid up so as to increase the thickness of the root section 104 of the fan blade 40. During manufacturing of the fan blade 40, for each of the predefined sections S, a laminate is laid up, formed to a final shape that corresponds to the predefined section S, and then the laminates are stacked to build up the complex geometry of the complex component. The composite component, or a preform of the component, can then be bagged, cured, and finish machined to the final desired shape. Exemplary methods for manufacturing such composite components are described below.

Figure 4:
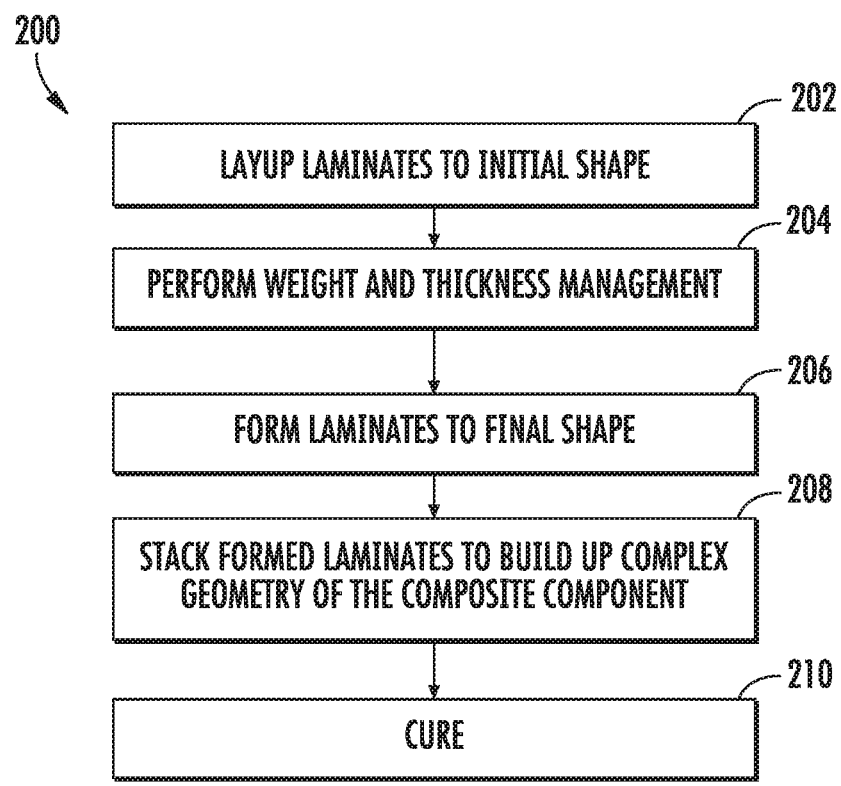
FIG. 4 provides a flow diagram of an exemplary method for manufacturing a composite component according to an exemplary embodiment of the present subject matter.

FIG. 4 provides a flow diagram of an exemplary method for manufacturing a composite component according to an exemplary embodiment of the present subject matter. More particularly, FIG. 4 provides a flow diagram for a method (200) for manufacturing a composite component having a complex geometry. Composite components having complex geometries can include, for example, the fan blade 40 of FIGS. 2 and 3, airfoils of a gas turbine engine (e.g., stator vanes and/or rotor blades), or other components having complex 3D curvature or high thickness gradients.

At block (202), the method (200) includes laying up a plurality of laminates. More particularly, the method (200) includes laying up each of the plurality of laminates to an initial shape. Each laminate includes one or more plies. The material of the one or more plies can be a reinforcement material embedded within a matrix material, such as e.g., SiC fibers embedded within a SiC matrix. In some embodiments, the plurality of laminates are laid up to their respective initial shapes with a substantially planar geometry or a gently curved geometry, e.g., by an automated layup system. By laying up the laminates 120 with an automated layup system to their respective initial shapes with a substantially planar or gently curved geometry, layup can be completed faster with improved quality and less material waste than a direct 3D-layup processes. Exemplary ways in which the laminates 120 can be laid up to their respective initial shapes are described below.

Figure 5:
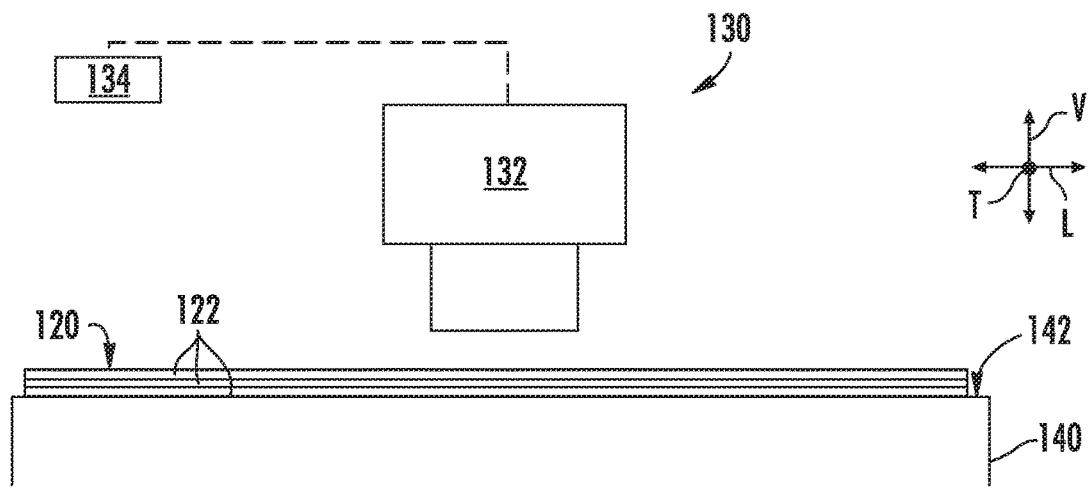
FIG. 5 provides a schematic view of an exemplary layup process according to an exemplary embodiment of the present subject matter.

FIG. 5 provides a schematic view of an exemplary layup process according to an exemplary embodiment of the present subject matter. In particular, FIG. 5 depicts a laminate 120 being laid up to an initial shape with a substantially planar geometry. A layup tool 140 is shown including a substantially planar surface 142 on which the laminate 120 is laid up by an automated layup system 130. Plies 122 of the laminate 120 can be placed on the layup tool 140 manually or automatically. The automated layup system 130 can be, for example, an Automated Tape Laying (ATL) system, an Automated Fiber Placement (AFP) system, a Thermoplastic Fiber/Tape Placement (TTP) system, or some combination of the foregoing. For instance, automated layup system 130 can be the AFP system disclosed in U.S. Patent Application Publication No. 2017/0043539, U.S. Pat. No. 8,667,999, and EP Application No. EP 0491353 A1, which are all hereby incorporated by reference in their respective entireties. The automated layup system 130 defines a vertical direction V, a lateral direction L, and a transverse direction T (extending into and out of the page in FIG. 5). The vertical direction V, lateral direction L, and the transverse direction T are mutually perpendicular and form an orthogonal direction system.

For the depicted embodiment of FIG. 5, automated layup system 130 is an AFP system. Generally, the automated layup system 130 includes a dispensing device 132 moveable along one or more of the lateral, transverse, and vertical directions L, T, and V and a controller 134 communicatively coupled with the dispensing device 132. In some embodiments, the dispensing device 132 is operatively configured to dispense pre-impregnated fiber tows. In other embodiments, the dispensing device 132 is operatively configured to dispense dry fiber tows. The controller 134 is operatively configured to control the dispensing device 132 and other features of the automated layup system 130. For instance, a layup program can be uploaded or programmed into the controller 134 such that the dispensing device 132 dispenses fibers in accordance with the program. The controller 134 can be a computer or other suitable computing device having a processor, a memory, and one or more interface devices for allowing user manipulation of the automated layup system 130.

By laying up the laminates 120 using automated layup system 130, manual labor and material waste can be reduced and the fibers can be advantageously steered as desired. Moreover, by laying up the laminates 120 to their respective initial shapes with a substantially planar geometry, the cost to layup the laminates 120 can be reduced compared to a direct 3D layup process. This may, for instance, increase layup speed, resulting in higher productivity and lower equipment cost. In some instances, layup speed may be dramatically increased.

Figure 6:
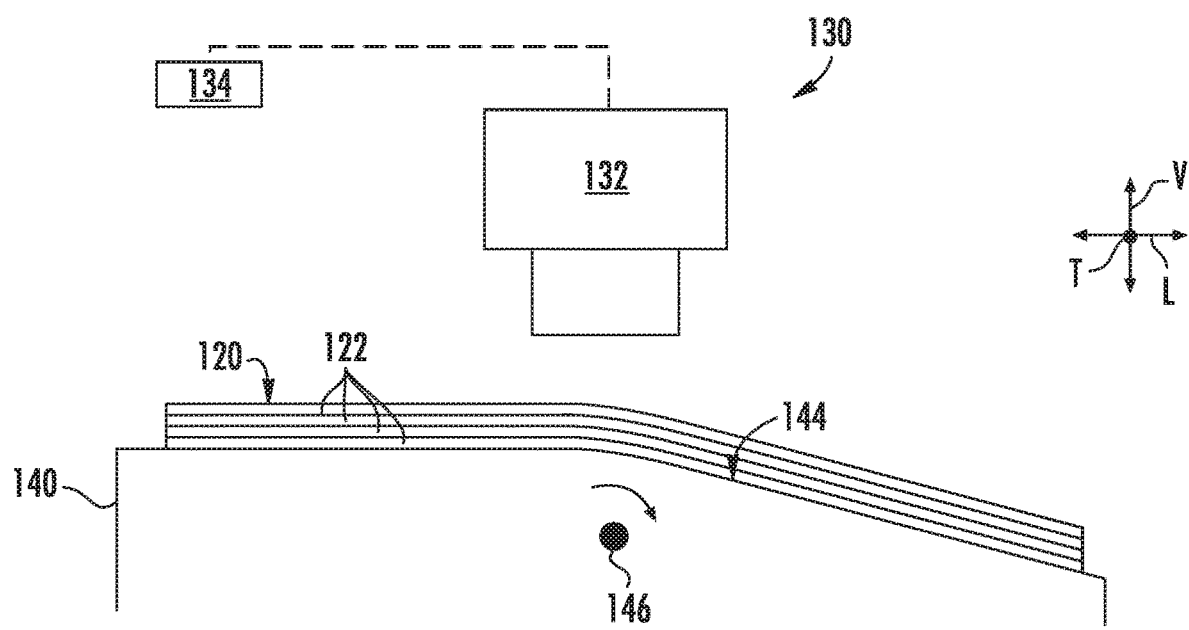
FIG. 6 provides a schematic view of another exemplary layup process according to an exemplary embodiment of the present subject matter.

FIG. 6 provides a schematic view of another exemplary layup process according to an exemplary embodiment of the present subject matter. In particular, FIG. 6 depicts laminate 120 being laid up to its initial shape with a gently curved geometry. For this embodiment, layup tool 140 is shown including a curved surface 144 on which the laminate 120 is laid up by automated layup system 130. As shown, curved surface 144 includes a single curve in this embodiment. In this way, for the depicted embodiment of FIG. 6, the laminate 120 laid up to its initial shape with the gently curved geometry is laid up with a single curvature geometry. For the single curvature geometry, as shown, the laminate 120 is laid up such that it is curved about a single axis, or a single curvature axis 146. For this embodiment, the single curvature axis 146 extends along the transverse direction T.

Figure 7:
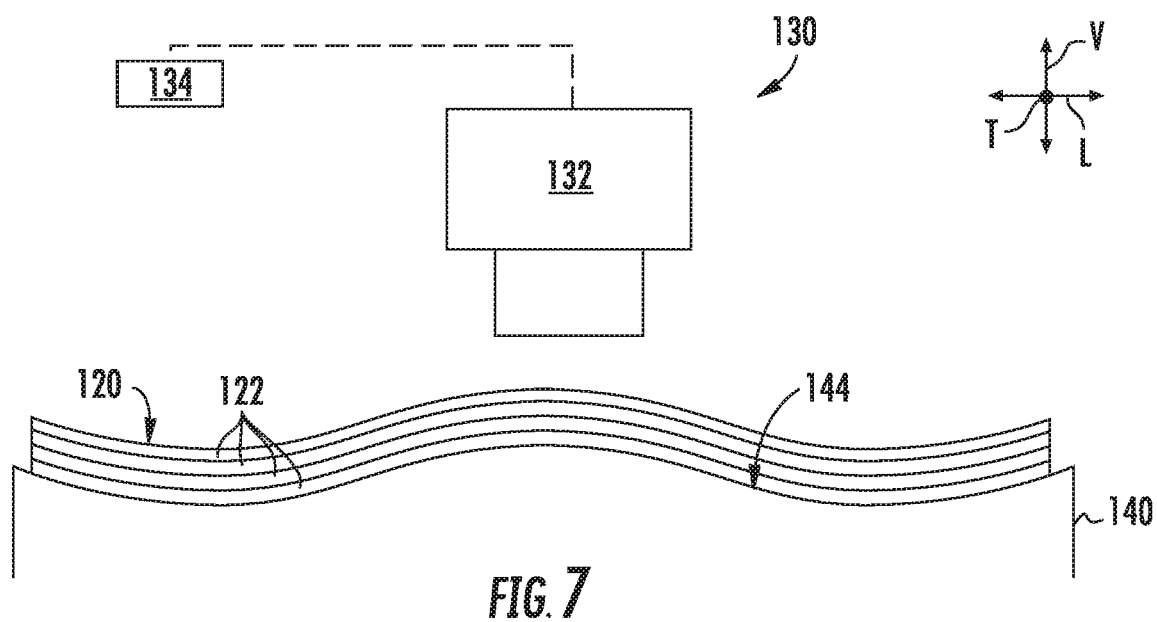
FIG. 7 provides a schematic view of yet another exemplary layup process according to an exemplary embodiment of the present subject matter.

FIG. 7 provides a schematic view of yet another exemplary layup process according to an exemplary embodiment of the present subject matter. Like the embodiment of FIG. 6, FIG. 7 depicts laminate 120 being laid up to its initial shape with a gently curved geometry. However, for this embodiment, layup tool 140 is shown including a curved surface 144 on which the laminate 120 is laid up by automated layup system 130. More particularly, curved surface 144 includes multiple curves about a single direction, or one of the lateral, transverse, and vertical directions L, T, V. For this embodiment, curved surface 144 curves only about the transverse direction T. By laying up the laminate 120 with curvature about only a single direction, the layup process can be streamlined and the laminates 120 can be laid up quickly with repeatable quality.

Figure 8:
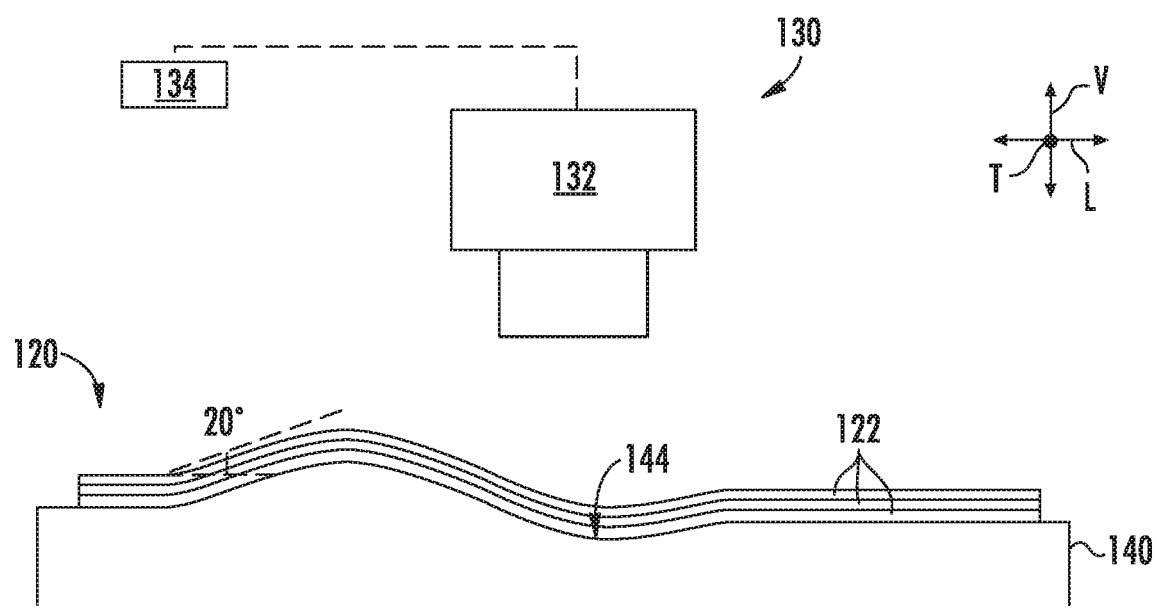
FIG. 8 provides a schematic view of yet another exemplary layup process according to an exemplary embodiment of the present subject matter.

FIG. 8 provides a schematic view of yet another exemplary layup process according to an exemplary embodiment of the present subject matter. Like the embodiments of FIGS. 6 and 7, FIG. 8 depicts laminate 120 being laid up to its initial shape with a gently curved geometry. However, for this embodiment, layup tool 140 is shown including a curved surface 144 on which the laminate 120 is laid up to its initial shape by automated layup system 130. More particularly, curved surface 144 of the layup tool 140 of FIG. 8 includes multiple curves about a single direction, or one of the lateral, transverse, and vertical directions L, T, V. For this embodiment, curved surface 144 curves only about the transverse direction T. In addition, for this embodiment, the laminates 120 laid up with the gently curved geometry are curved less than or equal to twenty degrees (20°) with respect to the direction of curvature, which in this embodiment is the transverse direction T. By laying up the laminate 120 with curvature about only a single direction and with curvature less than or equal to twenty degrees (20°) with respect to the direction of curvature, the layup process can be streamlined and the laminates 120 can be laid up quickly with repeatable quality. It will be appreciated that some laminates can be laid up with a substantially planar geometry (e.g., laid up flat) and some laminates can be laid up with a gently curved geometry depending on the application or the section of the composite component being laid up. In alternative embodiments, the laminates 120 laid up with the gently curved geometry are curved less than or equal to forty-five degrees (45°) with respect to the direction of curvature.

In some embodiments, the laminates can be laid up with an automated layup system to an initial shape with a gently curved geometry about a single direction, as noted above. In such embodiments, for the laminates to be laid up to their respective initial shapes with a gently curved geometry, the radius of curvature is greater than or equal to about 0.25 meters. In yet other embodiments, the radius of curvature is greater than or equal to about 1 meter.

In some embodiments, the laminates can be laid up with an automated layup system to an initial shape with a gently curved geometry about two directions, such as e.g., about the lateral and transverse directions L, T. Stated alternatively, the laminates can be laid up with double curvature. In such embodiments, for the laminates to be laid up to their respective initial shapes with a gently curved geometry, the radius of curvature is greater than or equal to about 0.25 meters. In yet other embodiments, the radius of curvature is greater than or equal to about 1 meter.

In some embodiments, the laminates can be laid up with a substantially planar geometry (as shown in FIG. 5) or with a gently curved geometry (as shown in FIGS. 6, 7, 8) by a manual process as opposed to using an automated layup system. In such embodiments, precut plies can be selected and placed on a layup tool to layup the laminate. Moreover, in some embodiments, any suitable number of laminates can be laid up manually and any suitable number of laminates can be laid up with an automated layup system, such as one of the automated layup systems described above. For instance, the type of layup process can be selected so as to optimize laminate properties, manufacturing costs, and part yield.

Returning to FIG. 4, at block (204), in some implementations, the method (200) includes performing laminate weight management. Weight management will be described below.

For weight management, after the plurality of laminates are laid up to their respective initial shapes, the plurality of laminates can be weighed. After weighing the laminates, it is determined which of the laminates can be used to form the composite component to within a predetermined weight range. The determined laminates are then grouped together or otherwise marked or labeled so that they ultimately can be used to form the composite component within the predetermined weight range. The laminates determined to form the composite component to within the predetermined weight range can but need not be physically grouped together (until stacking), marked, or labeled. It will be appreciated that the plurality of laminates laid up can exceed the number of laminates required to form the complex geometry of the composite component. By grouping the laminates together that can be used to ultimately form the composite component to within the predetermined weight range, the part-to-part weight variation can be reduced or eliminated, particularly in high production manufacturing. By reducing the part-to-part weight variation, gas turbine engine vibration, noise, and aerodynamic losses can be reduced, ultimately leading to improved fuel consumption.

Referring to FIG. 4, at block (206), the method (200) includes forming the laminates to their respective final shapes. In particular, the method (200) includes forming one or more of the plurality of laminates from their initial shapes to their respective final shapes for each of the predefined sections of the composite component. In most instances, the final shape is different from the initial shape. For example, one laminate can be laid up to its initial shape with gentle curvature and then formed to its final shape which has curvature about multiple directions and a large rate of curvature. Exemplary methods for forming the laminates to their respective final shapes are provided below.

In some embodiments, each laminate is formed individually on a forming tool dedicated to forming laminates to the final shape that corresponds with the desired geometry of the predefined section of the composite component. By forming the laminates for each predefined section of the composite laminate on dedicated forming tools, forming can be done efficiently without need to constantly change or modify the mold of the forming tool. This can, among other things, improve the repeatability of how the laminates are formed for each of the predefined sections of the composite component. Moreover, as the laminates each have a smaller thickness than the total thickness of the composite component, forming the laminates to their respective final shapes requires less forming force, forming can be done in a more efficient manner, and the laminates can be formed to more precise shapes.

Figure 9:
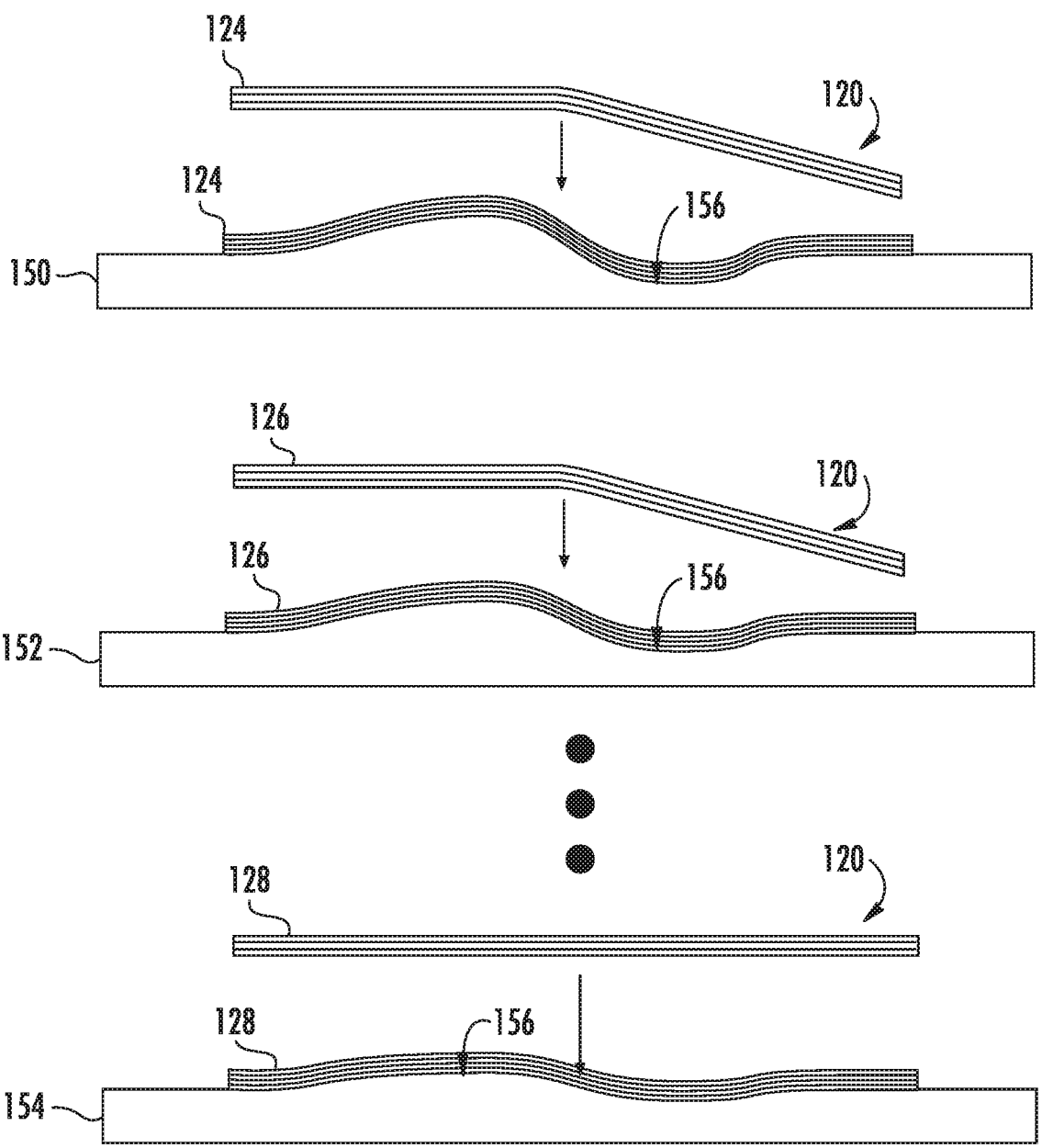
FIG. 9 provides a schematic view of an exemplary forming process according to an exemplary embodiment of the present subject matter.

FIG. 9 provides a schematic view of an exemplary forming process according to an exemplary embodiment of the present subject matter. As shown, for this embodiment, various laminates are formed individually on forming tools dedicated to forming a particular laminate to a final shape that corresponds with one of the predefined sections of the composite component to be formed. The forming tools can be any suitable type of forming tool, including e.g., a vacuum forming tool, pressure forming tool, a bladder system, a semi rigid or rigid tool, a combination of the foregoing, etc. Preferably, the forming tools are automated forming tools such that the forming process is an automated process.

More particularly, as shown in FIG. 9, a first laminate 124 is shown placed on a first forming tool 150 and formed to a final shape that corresponds with the first predefined section $S_1$ of the composite component 100 to be formed (FIG. 3). Preferably, the first laminate 124 is placed on the first forming tool 150 automatically, e.g. by a robotic system, but in some embodiments, the first laminate 124 can be placed on first forming tool 150 manually. The first laminate 124 being placed on the first forming tool 150 is shown laid up to its initial shape with a gently curved geometry, and more specifically for this embodiment, the gently curved geometry is curved about a single curvature axis 146 (FIG. 6). The gently curved geometry of the first laminate 124 allows the first laminate 124 to be formed by the first forming tool 150 faster with less effort and with better quality as the first laminate 124 is already partially curved to shape. In other exemplary embodiments, however, the first laminate 124 can be laid up to its initial shape with a gently curved geometry that is curved about multiple axes (i.e., double curvature) or with any of the other examples of gently curved geometry noted previously. As further depicted in FIG. 9, the first forming tool 150 includes a forming surface 156 that has the negative shape of the final shape to which the first laminate 124 will be formed. As shown in FIG. 9, when the first laminate 124 is placed on the forming surface 156, the first forming tool 150 forms the first laminate 124 to the final shape that corresponds with the first predefined section $S_1$ of the composite component 100 to be formed.

As further shown in FIG. 9, a second laminate 126 is being placed on a second forming tool 152 such that the second laminate 126 can be formed to a final shape that corresponds with a second predefined section $S_2$ of the composite component 100 to be formed (FIG. 3). Preferably, the second laminate 126 is placed on the second forming tool 152 automatically, but in some embodiments, the second laminate 126 can be placed on second forming tool 152 manually. The second laminate 126 placed on the second forming tool 152 is shown laid up to its initial shape with a gently curved geometry, and more specifically, the gently curved geometry is curved about a single curvature axis 146 (FIG. 6). The gently curved geometry of the second laminate 126 allows the second laminate 126 to be formed by the second forming tool 152 faster and with less force as the laminate is already partially curved to shape. In other exemplary embodiments, the second laminate 126 can be laid up to its initial shape with any of the previously noted examples of gently curved geometry. The second forming tool 152 includes forming surface 156 that has the negative shape of the final shape to which the second laminate 126 will be formed. As shown in FIG. 9, when the second laminate 126 is placed on the forming surface 156, the second forming tool 152 forms the second laminate 126 to the final shape that corresponds with a second predefined section $S_2$ of the composite component 100 to be formed.

Any suitable number of laminates can be formed to a final shape that corresponds with a predefined section S of the composite component 100 to be formed. For instance, as shown in FIG. 9, an Nth laminate 128 can be placed on an Nth forming tool 154 such that the Nth laminate 128 can be formed to a final shape that corresponds with an Nth predefined section $S_N$ of the composite component to be formed (FIG. 3). The Nth laminate 128 being placed on the second forming tool 152 is shown laid up with a substantially planar geometry. The substantially planar geometry of the Nth laminate 128 allows the Nth laminate 128 to be formed by the Nth forming tool 154 faster and with less force as the laminate need only be slightly formed to the curvature of the forming surface 156 of the Nth forming tool 154. When the Nth laminate 128 is placed on the forming surface 156, the Nth forming tool 154 forms the Nth laminate 128 to the final shape that corresponds with the Nth predefined section $S_N$ of the composite component 100 to be formed.

With reference to FIG. 4, after the laminates are formed to their respective final shapes for each predefined section S of the composite component, at block (208), the method (200) includes stacking the laminates to define or build up the complex geometry of the composite component. Exemplary methods for stacking the laminates are provided below.

Figure 10:
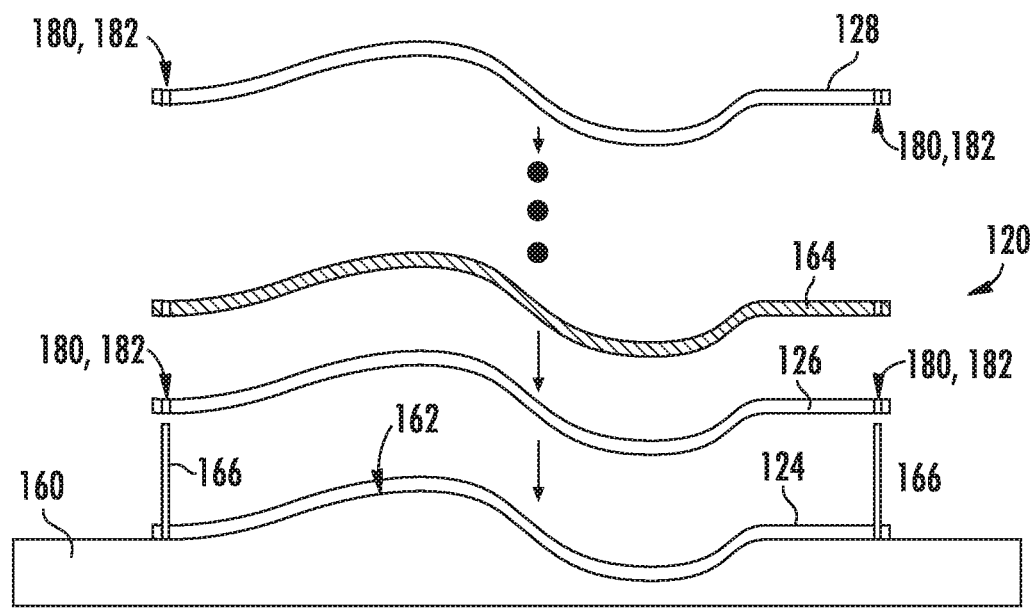
FIG. 10 provides a schematic view of an exemplary stacking process according to an exemplary embodiment of the present subject matter.
Figure 11:
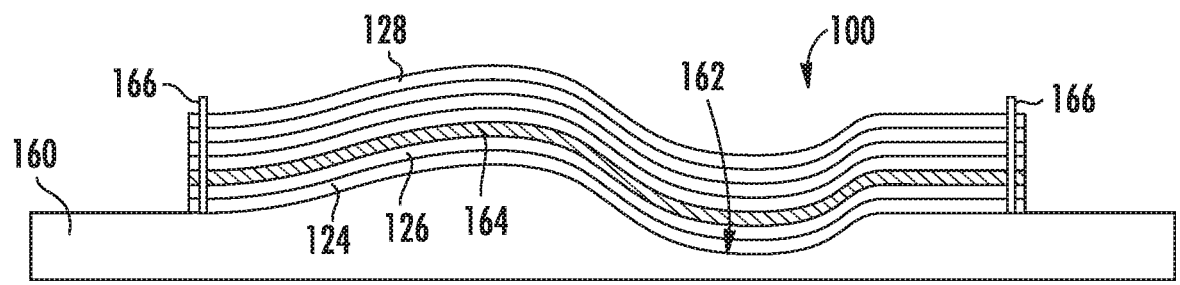
FIG. 11 provides a schematic view of an exemplary composite component built up to a desired shape.

FIG. 10 provides a schematic view of an exemplary stacking process according to an exemplary embodiment of the present subject matter. As shown, the relatively thin laminates each formed to their respective final shapes are stacked to build up the complex geometry of the composite component. In particular, the first laminate 124, now formed to the final shape that corresponds with one of the predefined sections of the composite component to be formed (e.g., predefined section $S_1$), is placed along a stacking surface 162 of the stacking tool 160. The stacking surface 162 has the negative shape of the final shape of the first laminate 124 as shown. An intermediate film or layer can be placed between the first laminate 124 and the stacking surface 162 to ease the removal of the stacked composite component. After the first laminate 124 is placed on the stacking surface 162, the second laminate 126 is placed or stacked on the first laminate 124. Further laminates each formed to their respective final shapes can be stacked in a similar fashion as the first laminate 124 to build up the complex geometry of the composite component. As shown in FIG. 10, the Nth laminate 128 can be stacked to form one of the outer surfaces of the composite component. FIG. 11 provides a schematic view of the laminates 120 stacked to build up the complex geometry of the composite component 100.

In some embodiments, weight and thickness management can take place during stacking. For example, a certain number of laminates formed to their respective final shapes can be stacked on stacking tool 160, and before stacking the remaining laminates to build up the complex geometry of the composite component 100, the thickness and/or weight of the partially built up component can be measured and/or weighed and adjustments can be made as needed to ensure that the composite component has the desired thickness and/or weight.

In some embodiments, during stacking, one or more inserts 164 can be inserted on or between one or more of the laminates 120. Exemplary inserts 164 can include pre-cured laminates, cores, inserts, metallic structures, rigid members, elastic semi rigid members, and the like. As shown in FIG. 10, insert 164, which is a foam core for this embodiment, is inserted between the second laminate 126 and the Nth laminate 128.

In addition, in some embodiments, prior to stacking, the method includes creating one or more reference features 180 for each of the plurality of laminates 120 to be stacked. By way of example, as shown in FIGS. 10 and 11, the laminates 120 to be stacked includes reference features 180, which in this embodiment are openings 182 defined by the laminates 120 at each of their respective ends. The openings 182 in the laminates 120 are created prior to being stacked. The openings 182 can be created by any suitable process, such as e.g., a punching press, a laser cutter, or some other suitable machining process. In this example, when stacking the laminates 120, the openings 182 of the laminates 120 are aligned with pins 166 extending from the stacking surface 162 of the stacking tool 160. Once aligned, the pins 166 are inserted through the openings 182 as the laminates 120 are stacked on the stacking tool 160. By creating the reference features 180 for each laminate 120, stacking the laminates 120 may be easier, more efficient, and the laminates 120 may be better aligned in their stacked arrangement. In some embodiments, during a finish machining process, the openings 182 can be removed. Additionally or alternatively, in some embodiments, at least some of the openings 182 can be filled with a material to improve the structural integrity of the finished composite component, such as e.g., a matrix material or a precured insert. In some embodiments, reference features 180 created for alignment for the laminates 120 could be other features besides openings 182, such as e.g., an edge marked with a contrasting color or the laminates can be laid up against a raised edge or flange.

Referring again to FIG. 4, at block (210) the method includes curing the built up composite component, which may for example be a preform component as this stage in the process. Curing the built up composite component or preform can include a number of processes. For instance, the stacked laminates built up to form the complex geometry of the composite component can be debulked and cured, e.g., exposed to elevated temperatures and pressures in an autoclave. The component may also be subjected to one or more further processes, such as e.g., a burn off cycle and a densification process. Further, the composite component may be finish machined as needed. Finish machining may define the final finished shape or contour of the composite component. For example, where the composite component is fan blade 40 (FIGS. 2 and 3), the edges of the fan blade 40 may be machined to define the final shape or contour of the airfoil 102 and the root section 104 of the blade. Additionally, the composite component can be coated with one or more suitable coatings, such as e.g., an environmental barrier coating (EBC) or a polyurethane surface coating.

It will be appreciated that method of FIG. 4 may include additional processes. Additionally, in various embodiments of method, other techniques may be used to cure the built up composite component. Moreover, it will be appreciated that the laminates may be formed from any appropriate reinforcement material and matrix material. As such, specific processing techniques and parameters for the above curing process will depend on the particular composition of the materials used.

Figure 12:
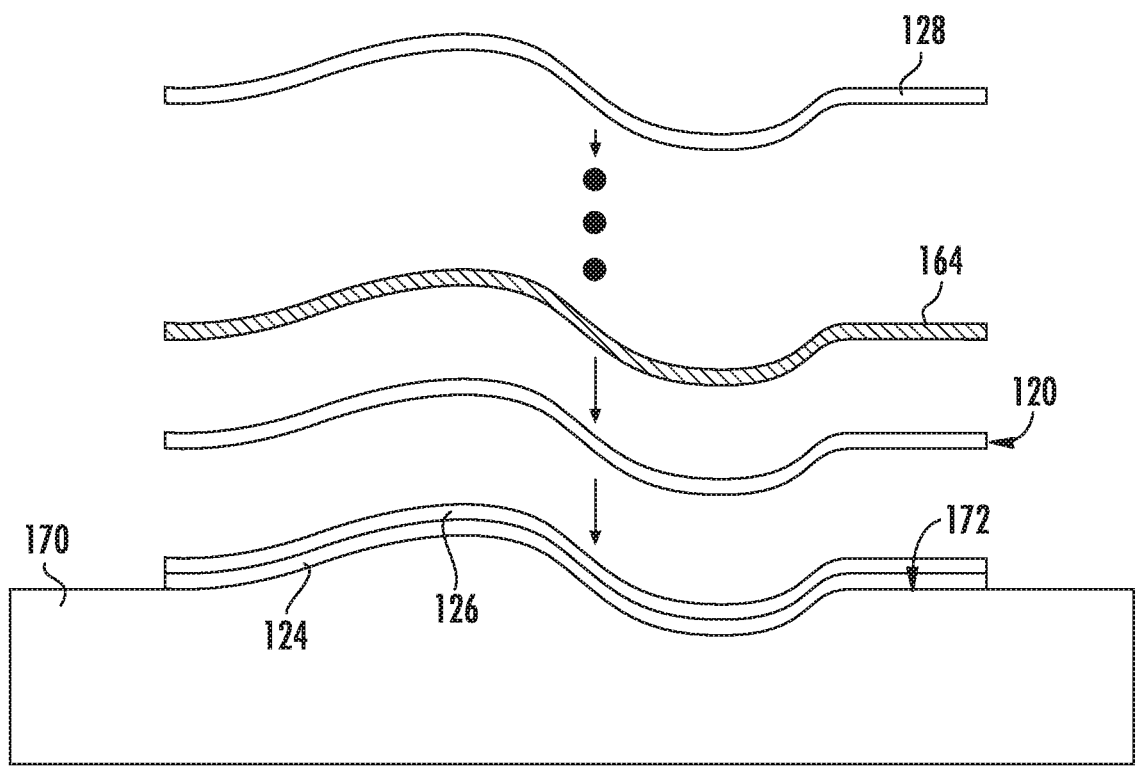
FIG. 12 provides a schematic view of an exemplary forming and stacking process according to an exemplary embodiment of the present subject matter.

FIG. 12 provides a schematic view of another exemplary forming and stacking process according to an exemplary embodiment of the present disclosure. That is, in some alternative exemplary methods, the laminates can be formed and stacked on a buildup tool 170, or a tool used for both forming and stacking. In such embodiments, a plurality of laminates 120 each having a plurality of plies 122 are laid up to their respective initial shapes. In particular, the laminates 120 are laid up with an automated layup system to their initial shapes with a substantially planar geometry or a gently curved geometry in a manner as noted above. Moreover, the plurality of laminates includes first laminate 124.

As shown in FIG. 12, the first laminate 124 is placed on a buildup surface 172 of the buildup tool 170 and then formed to a final shape that corresponds with the desired shape of one of the plurality of predefined sections S, which in this embodiment is the first predefined section $S_1$ (FIG. 3). Thereafter, second laminate 126 is stacked on the first laminate 124 and then formed to the final shape that corresponds with the desired shape of one of the plurality of predefined sections S, which in this embodiment is the second predefined section $S_2$ (FIG. 3). Subsequent laminates 120 are stacked and formed in the same manner up to the Nth laminate 128. That is, each subsequent laminate of the plurality of laminates is stacked and then formed on the first laminate 124 to build up the complex geometry of the composite component. For this embodiment, each laminate that is subsequently stacked on the first laminate 124 is formed to a final shape prior to stacking the next laminate. Stated differently, the laminates stacked on top of the first laminate 124 are stacked and then formed until the complex geometry or shape of the composite component is built up. As shown in FIG. 12, not all subsequent laminates are stacked directly on the first laminate 124, but rather there may be intermediate laminates 120 therebetween. Moreover, as further shown in FIG. 12, one or more inserts 164 can be inserted on or between one or more of the plurality of laminates 120.

Figure 13:
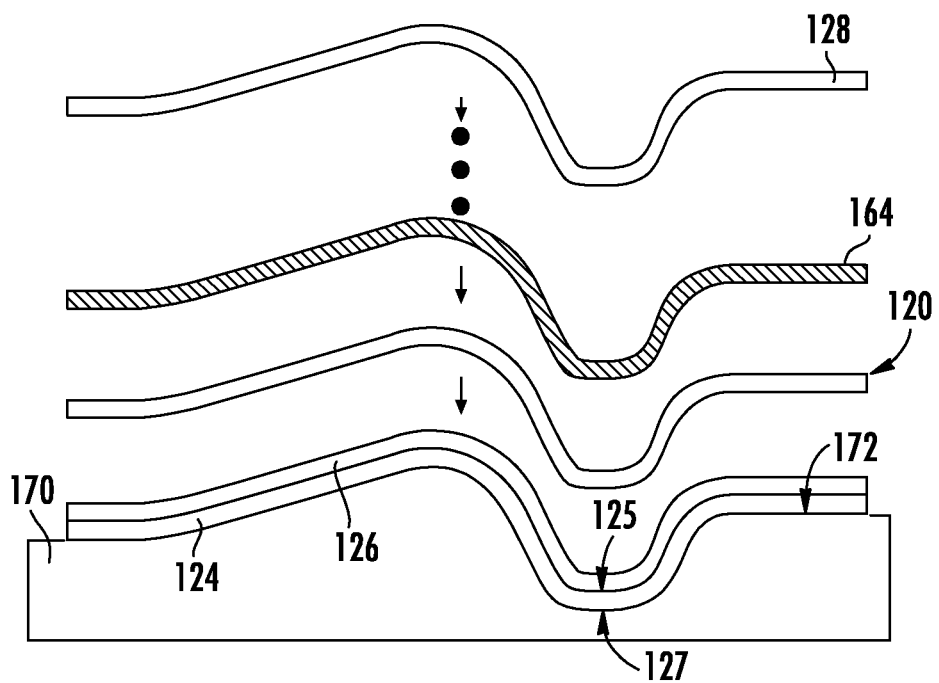
FIGS. 13 and 14 provide a schematic view of another exemplary forming and stacking process according to an exemplary embodiment of the present subject matter.
Figure 14:
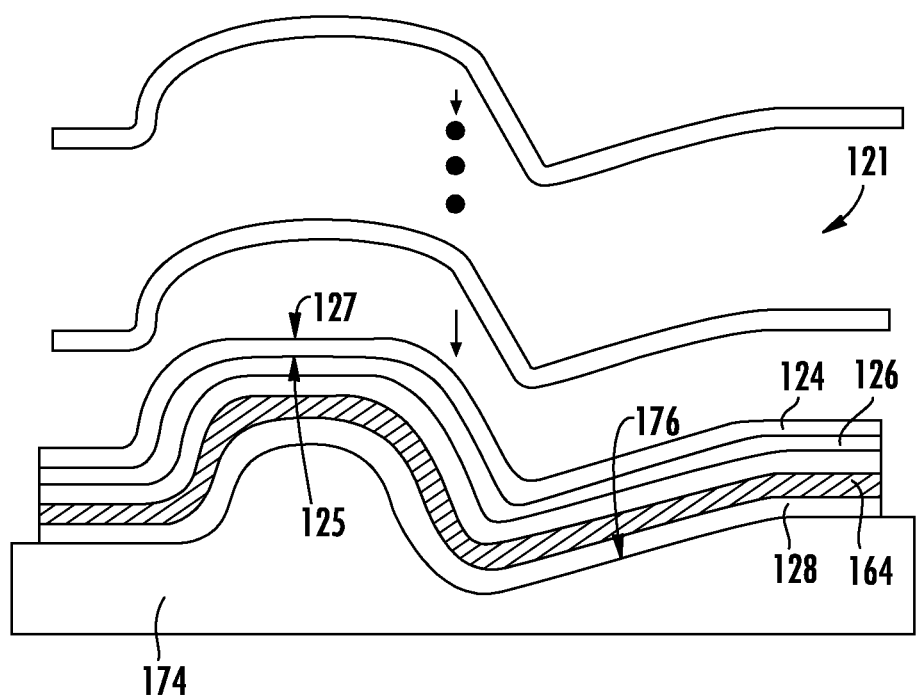

FIGS. 13 and 14 provide a schematic view of another exemplary forming and stacking process according to an exemplary embodiment of the present disclosure. For this embodiment, a plurality of laminates 120 each having one or more plies are laid up to their respective initial shapes with an automated layup system with a substantially planar geometry or a gently curved geometry in a manner as noted above.

As shown in FIG. 13, the first laminate 124 is placed on a buildup surface 172 of the buildup tool 170 and then formed to a final shape that corresponds with the desired shape of one of the plurality of predefined sections S, which in this embodiment is one of the middle predefined section S (FIG. 3) of the composite component 100 to be manufactured. Thereafter, second laminate 126 is stacked on top of a first side 125 of the first laminate 124 and then formed to the final shape that corresponds with the desired shape of one of the plurality of predefined sections S. Subsequent laminates 120 are stacked and formed in the same manner up to the Nth laminate 128. That is, each subsequent laminate of the plurality of laminates is stacked and then formed on top of the previous laminate to build up the complex geometry of the composite component on the first side 125 of the first laminate 124. For this embodiment, each laminate that is subsequently stacked on the previous laminate is formed to a final shape prior to stacking the next laminate. Moreover, as further shown in FIG. 13, one or more inserts 164 can be inserted on top of or between one or more of the plurality of laminates 120. As the first laminate 124 is formed to the final shape for one of the middle predefined sections S of the composite component to be formed, additional laminates can be added to the other side of the first laminate 124 as described below.

As shown in FIG. 14, after forming and stacking laminates 120 on the first side 125 of the first laminate 124, additional laminates 121 are formed and stacked on a second side 127 of the first laminate 124. The second side 127 is opposite the first side 125. In particular, as shown, the formed and stacked laminates 120 built up on buildup tool 170 are flipped upside down and placed on second buildup tool 174. The Nth laminate 128 is placed along a second buildup surface 176 of second buildup tool 174. The second buildup surface 176 is a mirror image or the negative shape of the Nth laminate 128. When the stacked and formed laminates 120 are flipped upside down, the second side 127 of the first laminate 124 is positioned to have further laminates 121 stacked and formed thereon in a manner as described above. By stacking and forming the laminates 120, 121 in the manner as shown in FIGS. 13 and 14 and described in the accompanying text, thickness management can be performed mid process and any stacking/forming inaccuracies that may occur are not compounded over the entire component, among other advantages.

Figure 15:
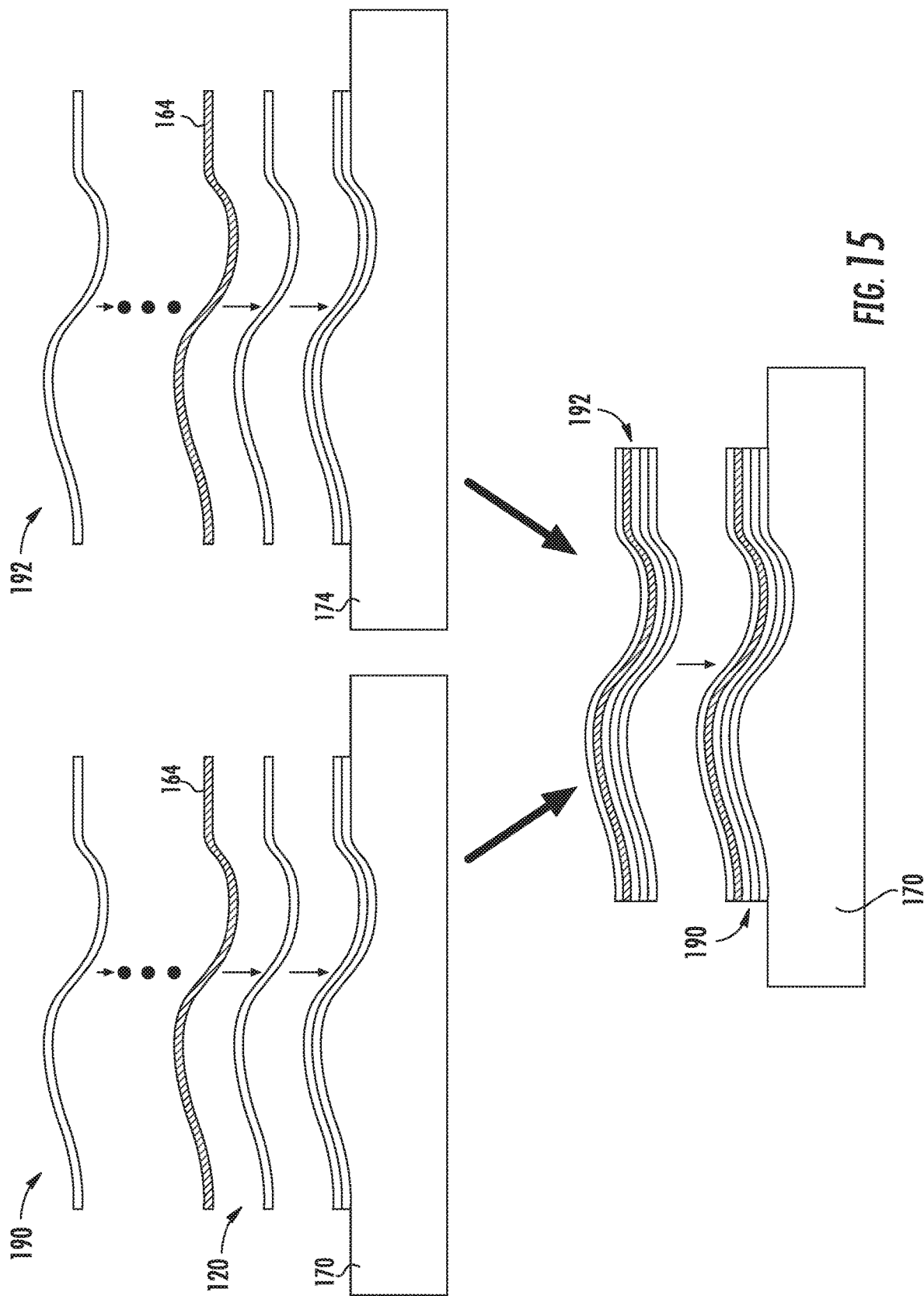
FIG. 15 provides a schematic view of yet another exemplary forming and stacking process according to an exemplary embodiment of the present subject matter.

FIG. 15 provides a schematic view of yet another exemplary forming and stacking process according to an exemplary embodiment of the present disclosure. For this embodiment, a plurality of laminates 120 each having one or more plies are laid up to their respective initial shapes with an automated layup system with a substantially planar geometry or a gently curved geometry in a manner as noted above.

As shown in FIG. 15, laminates 120 are stacked and formed on buildup tool 170 in a manner as described above to form a first stacked laminate 190. Likewise, laminates 121 are stacked and formed on second buildup tool 174 in a manner as described above to form a second stacked laminate 192. After the first and second stacked laminates 190, 192 are built up, the second stacked laminate 192 is stacked on top of the first laminate 190. This may, among other benefits, increase the speed of the stacking and forming processes.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for manufacturing a composite component having a complex geometry, the composite component to be formed defining a plurality of predefined sections, the method comprising: laying up each of a plurality of laminates to an initial shape, wherein each of the plurality of laminates comprise one or more plies, and wherein at least one laminate of the plurality of laminates is laid up to the initial shape with a gently curved geometry; forming, for each of the plurality of predefined sections, one or more of the plurality of laminates from the initial shape to a final shape, and wherein the at least one laminate is formed to the final shape with a larger curved geometry than the gently curved geometry of the initial shape, and wherein the at least one laminate has more curves when formed to the final shape than when laid up in the initial shape; weighing the plurality of laminates prior to stacking the plurality of laminates; after the weighing of the plurality of laminates, determining which of the plurality of laminates can be utilized to build up the composite component to within a predetermined weight range; and selecting from the plurality of laminates determined to be able to build up the composite component to within the predetermined weight range for the stacking of the plurality of laminates to build up the complex geometry of the composite component; thereafter, using a removable reference feature formed in each of the plurality of laminates in stacking the plurality of laminates formed to their respective final shapes to build up the complex geometry of the composite component; and removing the removable reference feature.

2. The method of claim 1, wherein one or more of the plurality of laminates are laid up to the initial shape with a substantially planar geometry or a gently curved geometry using an automated layup system.

3. The method of claim 2, wherein the automated layup system is an automated fiber placement system.

4. The method of claim 2, wherein the plurality of laminates laid up with the gently curved geometry are laid up with a single curvature geometry.

5. The method of claim 2, wherein the plurality of laminates define a vertical direction, a lateral direction, and a transverse direction each mutually perpendicular to one another, and wherein the plurality of laminates laid up with the gently curved geometry are laid up such that the plurality of laminates curve along only one of the vertical, lateral, and transverse directions.

6. The method of claim 2, wherein the plurality of laminates define a direction of curvature, and wherein the plurality of laminates laid up with the gently curved geometry are laid up such that the plurality of laminates are curved less than or equal to twenty degrees (20°) with respect to the direction of curvature.

7. The method of claim 1, wherein the one or more of the plurality of laminates formed for each of the predefined sections are formed separately from the laminates formed for the other predefined sections.

8. The method of claim 1, wherein each of the laminates formed to the final shape are formed individually on a forming tool dedicated to forming laminates to the final shape for one of the predefined sections.

9. The method of claim 8, wherein each of the forming tools are separate forming tools.

10. The method of claim 1, wherein the plurality of laminates laid up with the gently curved geometry are laid up with a double curvature geometry.

11. The method of claim 1, wherein after stacking, the method further comprises:
curing the composite component built up to the complex geometry.

12. The method of claim 1, wherein the removable reference feature is an opening, and removing the removable reference feature is by filling the removable reference feature with a matrix material or a precured insert.

13. The method of claim 1, wherein during stacking, the method further comprises:
inserting an insert on or between one or more of the plurality of laminates.

14. A method for manufacturing a composite component having a complex geometry, the composite component to be formed defining a plurality of predefined sections, the method comprising: laying up a plurality of laminates each comprising one or more plies to an initial shape, wherein one or more of the plurality of laminates are laid up to the initial shape with an automated layup system with a substantially planar geometry or a gently curved geometry, and wherein the plurality of laminates includes a first laminate, and wherein at least one laminate of the plurality of laminates is laid up to the initial shape with the gently curved geometry; forming the first laminate from the initial shape to a final shape for one of the plurality of predefined sections, and wherein the at least one laminate is formed to the final shape with a larger curved geometry than the gently curved geometry of the initial shape, and wherein the at least one laminate has more curves when formed to the final shape than when laid up in the initial shape; weighing the plurality of laminates prior to stacking the plurality of laminates to determine which of the plurality of laminates can be utilized to build up the composite component to within a predetermined weight range; selecting from the plurality of laminates determined to be able to build up the composite component to within the predetermined weight range for the stacking of the plurality of laminates to build up the complex geometry of the composite component; and stacking subsequent laminates of the plurality of laminates on top of the first laminate to their respective final shapes; wherein each of the stacked plurality of laminates include a removable reference feature used in the stacking of the plurality of laminates prior to removing the removable reference feature from the plurality of laminates.

15. The method of claim 14, wherein the first laminate is formed to the final shape that corresponds with a middle section of the plurality of predefined sections, and wherein during stacking and forming, subsequent laminates of the plurality of laminates are stacked and then formed on top of a first side of the first laminate, and wherein the method further comprises:

stacking and then forming subsequent laminates of the plurality of laminates on top of a second side of the first laminate to their respective final shapes to build up the complex geometry of the composite component.

16. The method of claim 14, wherein stacking and then forming subsequent laminates of the plurality of laminates on top of the first laminate to their respective final shapes are built up to form a first stacked laminate, and wherein the method further comprises:

stacking and then forming a plurality of laminates to build up a second stacked laminate; and stacking the first stacked laminate with the second stacked laminate.

17. A method for manufacturing a composite airfoil for a gas turbine engine, the airfoil to be manufactured defining a plurality of predefined sections, the method comprising: laying up a plurality of laminates to an initial shape, wherein each of the plurality of laminates comprise one or more plies having a reinforcement material embedded within a matrix material, wherein the plurality of laminates are laid up with a substantially planar geometry or a gently curved geometry using an automated layup system, and wherein at least one laminate of the plurality of laminates is laid up to the initial shape with the gently curved geometry; forming at least one of the plurality of laminates from the initial shape to a final shape for each of the plurality of predefined sections, and wherein the at least one laminate is formed to the final shape with a larger curved geometry than the gently curved geometry of the initial shape, and wherein the at least one laminate has more curves when formed to the final shape than when laid up in the initial shape; weighing the plurality of laminates prior to stacking the plurality of laminates to determine which of the plurality of laminates can be utilized to build up the composite component to within a predetermined weight range; selecting from the plurality of laminates determined to be able to build up the composite component to within the predetermined weight range for the stacking of the plurality of laminates to build up the complex geometry of the composite component; thereafter, stacking the plurality of laminates formed to their respective final shapes to build up the airfoil, using in the stacking a removable reference feature formed in each of the plurality of laminates; and removing the removable reference feature.

18. The method of claim 17, wherein the laminates are formed individually to their respective final shapes on separate forming tools each dedicated to forming laminates to the final shape that corresponds with one of the predefined sections of the airfoil to be formed.

19. The method of claim 17, wherein the airfoil is at least one of a fan blade, a compressor blade, a compressor stator vane, an inlet guide vane, a turbine blade, and a turbine stator vane.

\* \* \* \* \*